United States Patent
Guo et al.

(10) Patent No.: US 12,407,183 B2
(45) Date of Patent: Sep. 2, 2025

(54) BATTERY PACK, AIR CONDITIONING SYSTEM, AND METHOD FOR THE SAME

(71) Applicant: Carrier Corporation, Palm Beach Gardens, FL (US)

(72) Inventors: Xiaojun Guo, Shanghai (CN); Zehang Yu, Shanghai (CN); Hui Zhai, Shanghai (CN); Jian Ni, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 66 days.

(21) Appl. No.: 18/498,408

(22) Filed: Oct. 31, 2023

(65) Prior Publication Data
US 2024/0146100 A1    May 2, 2024

(30) Foreign Application Priority Data
Oct. 31, 2022    (CN) .......................... 202211343615.5

(51) Int. Cl.
*H02J 9/06* (2006.01)
*F24F 11/32* (2018.01)
(Continued)

(52) U.S. Cl.
CPC .............. *H02J 9/068* (2020.01); *F24F 11/32* (2018.01); *H02J 7/0047* (2013.01);
(Continued)

(58) Field of Classification Search
CPC ........ H02J 9/068; H02J 7/0047; H02J 7/0063; H02J 7/0068; H02J 7/345; H02J 2207/20; H02J 2207/50; F24F 11/32
See application file for complete search history.

(56) References Cited

U.S. PATENT DOCUMENTS

| | | |
|---|---|---|
| 4,541,563 A | 9/1985 | Uetsuhara |
| 5,200,644 A | 4/1993 | Kobayashi et al. |
| | (Continued) | |

FOREIGN PATENT DOCUMENTS

| | | |
|---|---|---|
| CN | 201787160 U | 4/2011 |
| CN | 204149816 U | 2/2015 |
| | (Continued) | |

OTHER PUBLICATIONS

Extended European Search Report received for EP Application No. 23206235.6, mailed on Apr. 9, 2024, 06 Pages.

*Primary Examiner* — Carlos Amaya
(74) *Attorney, Agent, or Firm* — Drew Folgmann

(57) ABSTRACT

The present application relates to a battery box, the battery box comprising: a charging and energy storage unit for charging and storing electrical energy using an input voltage supplied to the battery box; a power failure detection unit for detecting a power failure of the input voltage; and a power output switching unit for switching an output based on a detection result of the power failure detection unit, wherein the power output switching unit is configured to output a voltage from the charging and energy storage unit when the power failure detection unit detects a power failure, and is configured not to output the voltage when the power failure detection unit does not detect the power failure. The present application also relates to an air conditioning system and a control method for the air conditioning system.

18 Claims, 4 Drawing Sheets

(51) Int. Cl.
*H02J 7/00* (2006.01)
*H02J 7/34* (2006.01)

(52) U.S. Cl.
CPC .......... *H02J 7/0063* (2013.01); *H02J 7/0068* (2013.01); *H02J 7/345* (2013.01); *H02J 2207/20* (2020.01); *H02J 2207/50* (2020.01)

(56) References Cited

U.S. PATENT DOCUMENTS

| | | |
|---|---|---|
| 5,633,789 A | 5/1997 | Kimura et al. |
| 6,906,933 B2 | 6/2005 | Taimela |
| 8,203,235 B2 | 6/2012 | Fox et al. |
| 9,228,750 B2 | 1/2016 | Rockenfeller et al. |
| 11,089,719 B2 | 8/2021 | Sun et al. |
| 11,772,508 B2 * | 10/2023 | She ................. B60L 53/62 62/115 |
| 2003/0058595 A1 | 3/2003 | Murabayashi et al. |
| 2019/0020218 A1 * | 1/2019 | Okada ................ H02J 7/0068 |
| 2021/0131696 A1 | 5/2021 | She et al. |
| 2022/0090924 A1 * | 3/2022 | Schumacher ...... B60H 1/00428 |

FOREIGN PATENT DOCUMENTS

| | | |
|---|---|---|
| CN | 205753618 U | 11/2016 |
| CN | 106642602 A | 5/2017 |
| CN | 106051292 B | 2/2018 |
| CN | 111306744 A | 6/2020 |
| CN | 111306746 A | 6/2020 |
| CN | 212457335 U | 2/2021 |
| CN | 112762527 A | 5/2021 |
| CN | 113299348 A | 8/2021 |
| CN | 113551386 A | 10/2021 |
| CN | 113883703 A | 1/2022 |
| CN | 216407900 U | 4/2022 |
| WO | 2022020982 A1 | 2/2022 |

* cited by examiner

BATTERY PACK, AIR CONDITIONING SYSTEM, AND METHOD FOR THE SAME

CROSS REFERENCE TO RELATED APPLICATIONS

This application claims priority to Chinese Patent Application No. 202211343615.5 filed on Oct. 31, 2022, which is incorporated by reference herein in its entirety.

TECHNICAL FIELD

The present application relates to a battery box, an air conditioning system and a method for the air conditioning system.

BACKGROUND

In an air conditioning system (e.g. Variable Refrigerant Flow VRF system), once a refrigerant leak is detected, the refrigerant should be immediately recovered and locked in a specific pipeline in order to limit amount of the refrigerant leak, thus avoiding potential fire or explosion risks.

Therefore, valves (e.g., ball valves, etc.) in the air conditioning system should be shut down in a timely manner in the event of a sudden power failure. However, the control circuits in existing air conditioning systems may not have sufficient energy to shut down these valves after the sudden power failure.

SUMMARY

According to an aspect of the present application, there is provided a battery box, the battery box comprising: a charging and energy storage unit for charging and storing electrical energy using an input voltage supplied to the battery box; a power failure detection unit for detecting a power failure of the input voltage; and a power output switching unit for switching an output based on a detection result of the power failure detection unit, wherein the power output switching unit is configured to output a voltage from the charging and energy storage unit when the power failure detection unit detects a power failure, and is configured not to output the voltage when the power failure detection unit does not detect the power failure.

As a supplement or replacement of the foregoing, in the battery box, the power output switching unit is further configured not to output the voltage after a preset time period T of the power failure detected by the power failure detection unit.

As a supplement or replacement of the foregoing, in the battery box, the charging and energy storage unit comprises: an energy storage unit; and a charging unit for converting an AC input voltage supplied to the battery box to a DC voltage for charging the energy storage unit.

As a supplement or replacement of the foregoing, in the battery box, the charging and energy storage unit further comprises: a voltage regulating unit for converting a first DC voltage from the energy storage unit (e.g., a charge stored in the charging and energy storage unit) to a second DC voltage.

As a supplement or replacement of the foregoing, the battery box further comprises: an energy storage state detection unit for detecting whether a voltage from the energy storage unit satisfies a preset voltage threshold.

As a supplement or replacement of the foregoing, the battery box further comprises: a power supply line detection unit for detecting whether an output of the battery box is normally connected.

As a supplement or replacement of the foregoing, the battery box is configured to output a "ready" signal when the energy storage state detection unit detects that the voltage from the energy storage unit satisfies the preset voltage threshold and the power supply line detection unit detects that the output of the battery box is normally connected; otherwise, the battery box is configured to output a "not ready" signal.

As a supplement or replacement of the foregoing, the battery box further comprises: a micro-control unit MCU for receiving a power failure detection signal from the power failure detection unit and controlling the power output switching unit accordingly.

As a supplement or replacement of the foregoing, in the battery box, the micro-control unit MCU is further configured to receive a first detection signal from the energy storage state detection unit and a second detection signal from the power supply line detection unit; and the micro-control unit MCU is further configured to output a "ready" signal when the first detection signal indicates that the voltage from the energy storage unit satisfies the preset voltage threshold and the second detection signal indicates that the output of the battery box is normally connected; otherwise, the micro-control unit MCU is further configured to output a "not ready" signal.

According to another aspect of the present application, there is provided an air conditioning system, the system comprising: a battery box as previously described; and a control board circuit for receiving an output voltage from the battery box for a safe operation.

As a supplement or replacement of the foregoing, in the system, the control board circuit is configured to actuate one or more valves to perform a shutdown operation when the output voltage provided by the battery box is greater than a preset threshold.

According to another aspect of the present application, there is provided a control method for an air conditioning system, the method comprising: charging an energy storage capacitor in the air conditioning system using an input voltage; detecting a power failure of the input voltage; outputting a voltage of the energy storage capacitor when the power failure of the input voltage is detected, and not outputting the voltage when the power failure is not detected; and performing a safe operation on the air conditioning system based on the output voltage.

As a supplement or replacement of the foregoing, the method further comprises: not outputting the voltage after a preset time period T of the power failure detected.

As a supplement or replacement of the foregoing, the method further comprises: outputting a "ready" signal when the voltage of the energy storage capacitor satisfies a preset voltage threshold and a voltage output terminal is normally connected; otherwise, outputting a "not ready" signal.

As a supplement or replacement of the foregoing, in the method, the safe operation on the air conditioning system based on the output voltage comprises: actuating one or more valves to perform a shutdown operation when the "ready" signal is received and the output voltage is greater than a preset threshold.

DESCRIPTION OF THE DRAWINGS

The above and/or other aspects and advantages of the present application will be clearer and more easily understood from the following description of various aspects in conjunction with the accompanying drawings, in which the same or similar elements are denoted by the same reference numerals. The accompanying drawings include.

DETAILED DESCRIPTION

Figure 1:
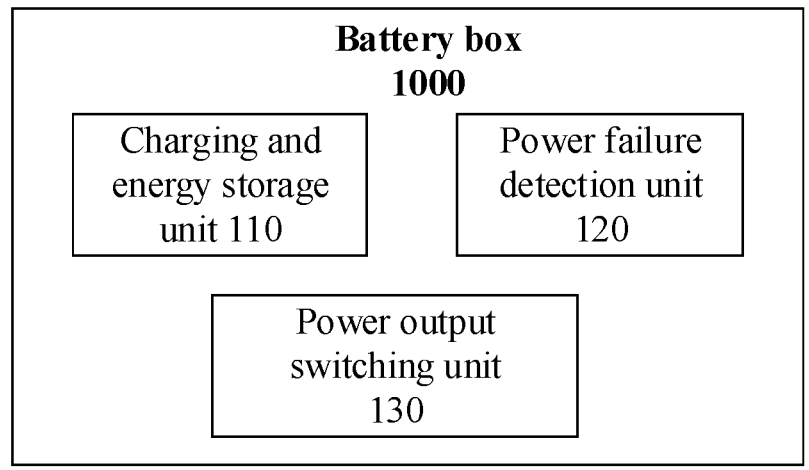
FIGS. 1 to 3 are schematic diagrams of a structure of a battery box according to embodiments of the present application.

The present application is described more fully below with reference to the accompanying drawings, in which illustrative embodiments of the present application are illustrated. However, the present application may be implemented in different forms and should not be construed as limited to the embodiments presented herein. The presented embodiments are intended to make the disclosure herein comprehensive and complete, so as to more comprehensively convey the protection scope of the present application to those skilled in the art.

In this specification, terms such as "comprising" and "including" mean that in addition to units and steps that are directly and clearly stated in the specification and claims, the technical solution of the application does not exclude the presence of other units and steps that are not directly or clearly stated in the specification and claims.

Unless otherwise specified, terms such as "first" and "second" do not indicate the order of the units in terms of time, space, size, etc., but are merely used to distinguish the units.

In this specification, "coupled" should be understood as including a case in which electrical energy or electrical signals are transmitted directly between two units, or a case in which electrical energy or electrical signals are transmitted indirectly through one or more third units.

In accordance with some embodiments of the present application, a battery box comprises a power output switching unit, the power output switching unit is configured to output a voltage from a charging and energy storage unit when a power failure detection unit detects a power failure of an input voltage of the battery box, and configured not to output the voltage when the power failure detection unit does not detect the power failure. In this way, the battery box is capable of, on the one hand, performing voltage output in a timely manner in the event of a sudden power failure, thereby providing sufficient energy for a related control circuit (e.g., a control board circuit) to perform a safe operation (e.g., shutting down a ball valve), and, on the other hand, performing no voltage output in the event of no power failure, thereby not affecting other control circuits. In accordance with some embodiments of the present application, the power output switching unit is also configured not to output the voltage after a preset time period T of the power failure detected by the power failure detection unit. That is, the battery box is capable of not only automatically providing energy (voltage output) at the time of power failure, but also automatically cutting off the energy output after a time period.

In accordance with some embodiments of the present application, the battery box further comprises: an energy storage state detection unit for detecting whether the voltage from the energy storage unit satisfies a preset voltage threshold; and a power supply line detection unit for detecting whether an output of the battery box is normally connected (e.g., whether loosening occurs). In these embodiments, the battery box is configured to output a "ready" signal when the energy storage state detection unit detects that the voltage from the energy storage unit satisfies the preset voltage threshold and the power supply line detection unit detects that the output of the battery box is normally connected; otherwise, to output a "not ready" signal. That is, in addition to providing the output voltage, the battery box can provide the current state of energy storage and the state of the output connection (e.g., by means of the "ready" signal) to an external circuit. This solution enables timely warning of power and circuit failures and improves the safety of the system application.

Specific embodiments of the present application are further described below with the aid of the accompanying drawings. It should be noted that some non-essential features or circuit elements are not shown in the accompanying drawings for the purpose of more clearly describing what is relevant to the present application. However, for those skilled in the art, such omissions do not create difficulties in the implementations of the technical solutions described in the specification of the present application.

FIG. 1 is a schematic diagram of a structure of a battery box 1000 according to embodiments of the present application. As shown in FIG. 1, the battery box 1000 comprises: a charging and energy storage unit 110, a power failure detection unit 120, and a power output switching unit 130. Wherein, the charging and energy storage unit 110 is used to charge and store electrical energy using an input voltage supplied to the battery box 1000; the power failure detection unit 120 is used to detect a power failure of the input voltage; and the power output switching unit 130 is used to switch an output based on a detection result of the power failure detection unit 120, wherein the power output switching unit 130 is configured to output a voltage from the charging and energy storage unit 110 when the power failure detection unit 120 detects a power failure, and is configured not to output the voltage when the power failure detection unit 120 does not detect the power failure.

In the context of the present application, the term "power failure" may also be referred to as a power loss, meaning that no power is supplied to the battery box, for example, due to a sudden power failure, a malfunction, or the like. In the above embodiments of the present application, the power output switching unit 130 is configured to output a voltage from the charging and energy storage unit 110 when the power failure detection unit 120 detects the power failure of the input voltage of the battery box, and is configured not to output the voltage when the power failure detection unit 120 does not detect the power failure. In this way, the battery box 1000 is capable of performing voltage output in a timely manner in the event of a sudden power failure/power loss, thereby providing sufficient energy for a related control circuit (e.g., a control board circuit) to perform a safe operation (e.g., shutting down a ball valve).

In one embodiment, the power output switching unit 130 is further configured not to output the voltage after a preset time period T of the power failure detected by the power failure detection unit 120. In this way, the battery box 1000 is capable of not only automatically providing energy output at the time of power failure, but also automatically cutting off the energy output after a time period (i.e., the preset time period T), further improving safety.

In one embodiment, the charging and energy storage unit 110 may comprise: an energy storage unit; and a charging unit for converting an AC input voltage supplied to the battery box to a DC voltage for charging the energy storage unit. For example, the energy storage unit may comprise one or more capacitor (or super-capacitor) modules, and the charging unit charges one or more capacitor modules in the energy storage unit after converting the AC input voltage to the DC voltage. In one embodiment, the charging and energy storage unit 110 may further comprise a voltage regulating unit for converting the voltage from the energy storage unit, for example from a first DC voltage to a second DC voltage different from the first DC voltage.

Although not shown in FIG. 1, in one embodiment the battery box 1000 further comprises: an energy storage state detection unit for detecting whether a voltage from the energy storage unit satisfies a preset voltage threshold (e.g. whether it is greater than 5V). In one embodiment, the battery box 1000 may further comprise: a power supply line detection unit for detecting whether an output of the battery box 1000 is normally connected (e.g., whether loosening occurs). In one embodiment, the battery box 1000 is configured to output a "ready" signal when the energy storage state detection unit detects that the voltage from the energy storage unit satisfies the preset voltage threshold and the power supply line detection unit detects that the output of the battery box 1000 is normally connected; otherwise, the battery box 1000 is configured to output a "not ready" signal.

Figure 2:
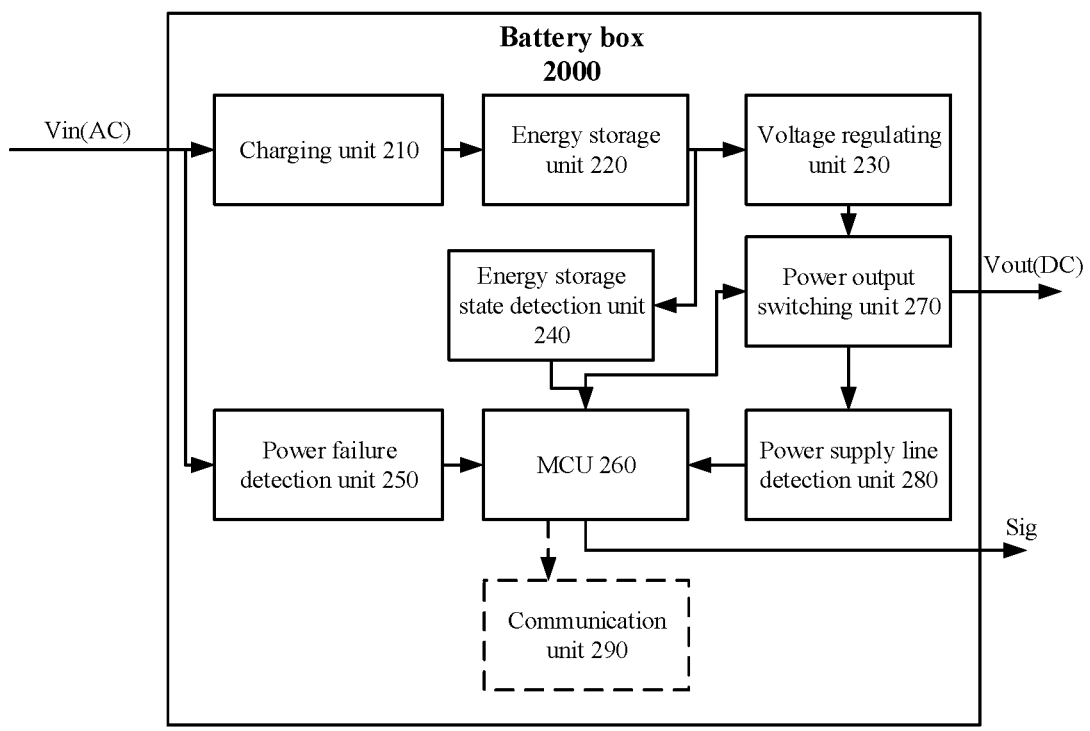

FIG. 2 shows a schematic diagram of a structure of a battery box 2000 according to embodiments of the present application. As shown in FIG. 2, the battery box 2000 comprises a micro-control unit MCU 260 for receiving a power failure detection signal from a power failure detection unit 250 and controlling a power output switching unit 270 accordingly.

Continuing to refer to FIG. 2, in addition to the micro-control unit MCU 260, the battery box 2000 further comprises: a charging unit 210, an energy storage unit 220, a voltage regulating unit 230, an energy storage state detection unit 240, a power failure detection unit 250, a power output switching unit 270, and a power supply line detection unit 280.

In the embodiment of FIG. 2, the charging unit 210 is used to convert an AC input voltage Vin supplied to the battery box 2000 to a DC voltage for charging the energy storage unit 220. For example, the energy storage unit 220 may comprise one or more capacitor (or supercapacitor) modules, and the charging unit 210 charges one or more capacitor modules in the energy storage unit 220 after converting the AC input voltage to the DC voltage. The voltage regulating unit 230 is used to convert the voltage from the energy storage unit 220, for example, from a first DC voltage to a second DC voltage different from the first DC voltage, in order to provide the converted voltage to the power output switching unit 270.

The energy storage state detection unit 240 is used to detect whether a voltage from the energy storage unit 220 satisfies a preset voltage threshold (e.g. whether it is greater than 5V). The power supply line detection unit 280 is used to detect whether an output Vout of the battery box 2000 is normally connected (e.g., whether loosening occurs, whether a malfunction occurs, etc.).

The power failure detection unit 250 is used to detect a power failure of the AC input voltage Vin and to provide a power failure detection result to the micro-control unit MCU 260. In one embodiment, the micro-control unit MCU 260 is further configured to receive a first detection signal from the energy storage state detection unit 240 and a second detection signal from the power supply line detection unit 280; and to output a "ready" signal (i.e., Sig indicates "ready") when the first detection signal indicates that the voltage from the energy storage unit 220 satisfies the preset voltage threshold and the second detection signal indicates that the output of the battery box 2000 is normally connected; otherwise, to output a "not ready" signal (i.e., Sig indicates "not ready").

In one embodiment, as shown in FIG. 2, the battery box 2000 further comprises: a communication unit 290 for communicating with an external circuit. For example, the communication unit 290 includes an RS485 port for communicating with a control board circuit to provide information (e.g. information about the capacity, etc.) regarding the interior of the battery box. In one embodiment, the Sig signal may also be transmitted to the external circuit via this communication unit 290.

In this way, the power output switching unit 270 (under the control of the micro-control unit MCU 260) may be configured to output the voltage provided by the voltage regulating unit 230 when the power failure detection unit 250 detects a power failure, and configured not to output the voltage when the power failure is not detected. In one embodiment, the power output switching unit 270 is configured not to output the voltage after a preset time period T of the power failure detected by the power failure detection unit 250 (e.g., after outputting the voltage provided by the voltage regulating unit 230 for a period of time). In this way, the battery box 2000 is capable of not only automatically providing energy output at the time of power failure, but also automatically cutting off the energy output after a time period, further improving safety.

Figure 3:
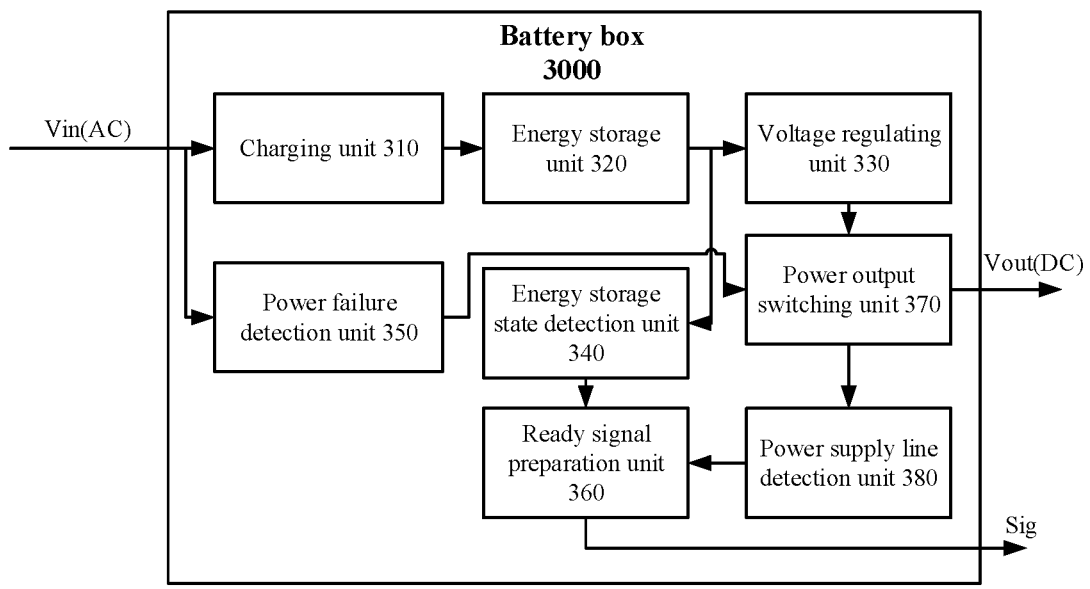

FIG. 3 shows a schematic diagram of a structure of a battery box 3000 according to embodiments of the present application. Compared to the battery box 2000 of FIG. 2, the battery box 3000 does not comprise a micro-control unit MCU. As shown in FIG. 3, the battery box 3000 comprises: a charging unit 310, an energy storage unit 320, a voltage regulating unit 330, an energy storage state detection unit 340, a power failure detection unit 350, a power output switching unit 370, and a power supply line detection unit 380.

In the embodiment of FIG. 3, the charging unit 310 is used to convert an AC input voltage Vin supplied to the battery box 3000 to a DC voltage for charging the energy storage unit 320. For example, the energy storage unit 320 may comprise one or more capacitor (or supercapacitor) modules, and the charging unit 310 charges one or more capacitor modules in the energy storage unit 320 after converting the AC input voltage to the DC voltage. The voltage regulating unit 330 is used to convert the voltage from the energy storage unit 320, for example, from a first DC voltage to a second DC voltage different from the first DC voltage, in order to provide the converted voltage to the power output switching unit 370.

The energy storage state detection unit 340 is used to detect whether a voltage from the energy storage unit 320 satisfies a preset voltage threshold (e.g. whether it is greater than 5V). The power supply line detection unit 380 is used to detect whether an output Vout of the battery box 3000 is normally connected (e.g., whether loosening occurs).

The power failure detection unit 350 is used to detect a power failure of the AC input voltage Vin and to provide a power failure detection result to the power output switching unit 370. For example, when the power failure is detected, the power failure detection unit 350 provides a high voltage (e.g., "1") to the power output switching unit 370; and when the power failure is not detected, the power failure detection unit 350 provides a low voltage (e.g., "0") to the power output switching unit 370.

Referring further to FIG. 3, in addition to the foregoing units, the battery box 3000 further comprises: a ready signal preparation unit 360 for receiving a first detection signal from the energy storage state detection unit 340 and receiving a second detection signal from the power supply line detection unit 380, and outputting a Sig signal.

In one embodiment, when the first detection signal is "1", it indicates that the voltage from the energy storage unit 320 satisfies the preset voltage threshold (e.g., in a "fully charged" state), otherwise the first detection signal is "0"; when the second detection signal is "1", it indicates that the output of the battery box 3000 is normally connected, otherwise the second detection signal is "0". In this embodiment, the ready signal preparation unit 360 may be a "logic AND" gate. Thus, the ready signal preparation unit 360 is configured to output "1" only when both the first detection signal and the second detection signal are "1" (assuming that the Sig signal is "1" indicating "ready"), and otherwise to output "0" (assuming that the Sig signal is "0" indicating "not ready").

In another embodiment, when the first detection signal is "0", it indicates that the voltage from the energy storage unit 320 satisfies the preset voltage threshold (e.g., in a "fully charged" state), otherwise the first detection signal is "1"; when the second detection signal is "0", it indicates that the output of the battery box 3000 is normally connected, otherwise the second detection signal is "1". In this embodiment, the ready signal preparation unit 360 may be a "logic OR" gate. Thus, the ready signal preparation unit 360 is configured to output "0" only when both the first detection signal and the second detection signal are "0" (assuming that the Sig signal is "0" indicating "ready"), and otherwise to output "1" (assuming that the Sig signal is "1" indicating "not ready").

The power output switching unit 370 is configured to output the voltage provided by the voltage regulating unit 330 when the power failure detection unit 350 detects a power failure, and configured not to output the voltage when the power failure detection unit 350 does not detect the power failure. In one embodiment, the power output switching unit 370 is further configured not to output the voltage after a preset time period T of the power failure detected by the power failure detection unit 350 (e.g., after outputting the voltage provided by the voltage regulating unit 330 for a period of time). In this way, the battery box 3000 is capable of not only automatically providing energy output at the time of power failure, but also automatically cutting off the energy output after a time period, further improving safety.

Figure 4:
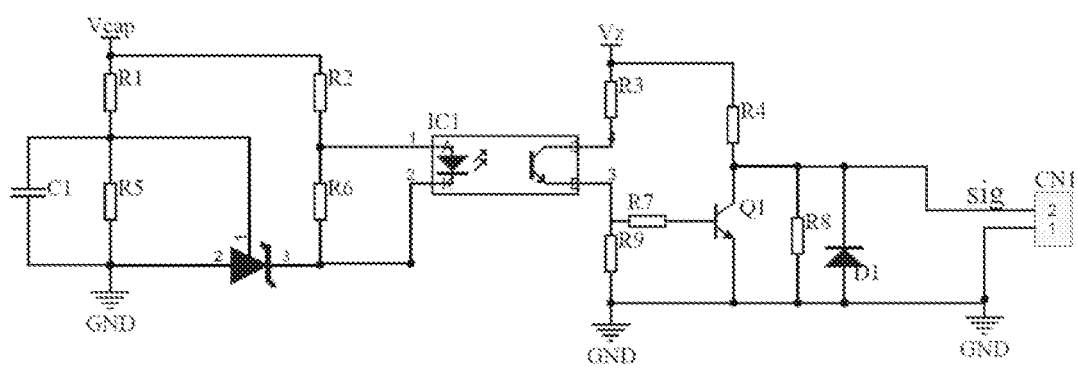
FIG. 4 is a circuit schematic diagram of energy storage state detection and power supply line detection according to embodiments of the present application.

FIG. 4 is a circuit schematic diagram of energy storage state detection and power supply line detection according to embodiments of the present application. In FIG. 4, Vcap denotes a terminal voltage of the energy storage unit (capacitor modules in the energy storage unit), and Vz denotes a voltage output from the battery box (via feedback). In the circuit of FIG. 4, sig=0 only if Vcap is greater than a specific voltage value (i.e., the voltage from the energy storage unit satisfies a preset voltage threshold) and Vz is present (i.e., the output of the battery box is normally connected).

As shown in FIG. 4, the terminal voltage Vcap of the energy storage unit (capacitor modules in the energy storage unit) is coupled with a first end of a first resistor R1, a second end of the first resistor R1 is coupled with a first end of a first capacitor C1, a first end of a fifth resistor R5, respectively, and a second end of the first capacitor C1 and a second end of the fifth resistor R5 are grounded. Also, the second end of the first resistor R1 is further coupled with a diode (a first end of the diode) with a reference voltage. A second end of the diode is grounded, and a third end of the diode is coupled with a second end of a sixth resistor R6 and a second end of a photocoupler IC1, respectively. The terminal voltage Vcap of the energy storage unit (capacitor modules in the energy storage unit) is also coupled with a first end of a second resistor R2, and a second end of the second resistor R2 is coupled with a first end of the photocoupler IC1 and a first end of the sixth resistor R6, respectively.

The voltage Vz output from the battery box is coupled with a first end of a third resistor R3 and a first end of a fourth resistor R4, respectively, a second end of the third resistor R3 is coupled with a fourth end of the photocoupler IC1, and a third end of the photocoupler IC1 is coupled with a first end of a seventh resistor R7 and a first end of a ninth resistor R9, respectively, a second end of the ninth resistor R9 is grounded, a second end of a seventh resistor R7 is coupled with a base of a first triode Q1, an emitter of the first triode Q1 is grounded, and a collector is coupled with a second end of the fourth resistor R4. The second end of the fourth resistor R4 is also coupled with a first end of an eighth resistor, a first end of a first diode D1, and a second end of an electrical connector CN1, respectively. In addition, a second end of the eighth resistor, a second end of the first diode D1, and a first end of the electrical connector CN1 are grounded.

In one embodiment, when the terminal voltage Vcap of the energy storage unit (capacitor modules in the energy storage unit) is greater than the reference voltage of the diode (e.g., 2.5 V) after being voltage-divided by the first resistor R1 and the fifth resistor R5, the diode conducts, and then the photocoupler IC1 conducts. When the voltage Vz output from the battery box is present, the first triode W1 conducts after being voltage-divided by the third resistor R3, the seventh resistor R7, and the ninth resistor R9, causing sig to be pulled down, i.e., sig=0. And when the terminal voltage Vcap of the energy storage unit (capacitor modules in the energy storage unit) is not greater than the reference voltage of the diode (e.g., 2.5 V) after being voltage-divided by the first resistor R1 and the fifth resistor R5, the diode is disconnected, and the photocoupler IC1 does not conduct. As the photocoupler IC1 does not conduct, the first triode Q1 cuts off. When the voltage Vz output from the battery box is present, sig is pulled up by Vz, i.e. sig=1.

In one or more embodiments, the circuit schematic diagram of the energy storage state detection and the power supply line detection of FIG. 4 may correspond to the energy storage state detection unit 340, the power supply line detection unit 380 and the ready signal preparation unit 360 of FIG. 3, wherein the ready signal preparation unit 360 is used to receive a first detection signal from the energy storage state detection unit 340 and a second detection signal from the power supply line detection unit 380, and to output a Sig signal.

Figure 5:
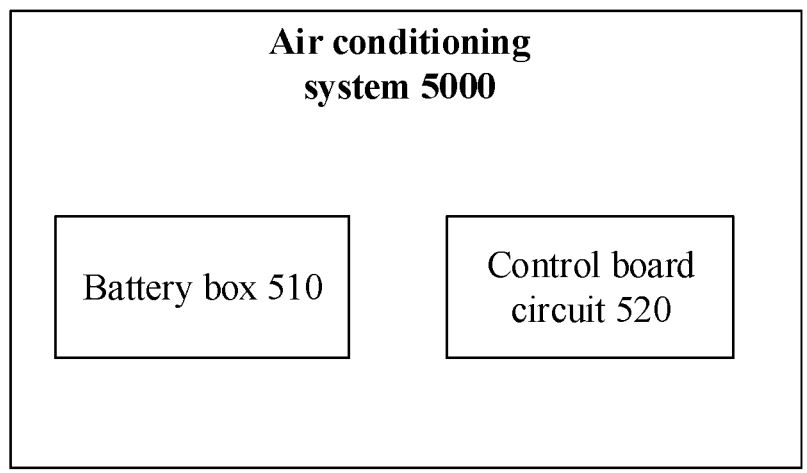
FIG. 5 is a schematic diagram of an air conditioning system according to embodiments of the present application.

FIG. 5 is a schematic diagram of an air conditioning system 5000 according to embodiments of the present application. As shown in FIG. 5, the air conditioning system

5000 comprises: a battery box 510; and a control board circuit 520 for receiving an output voltage from the battery box 510 for a safe operation. In one or more embodiments, the control board circuit 520 is configured to actuate one or more valves (e.g., ball valves) to perform a shutdown operation when the output voltage provided by the battery box 510 is greater than a preset threshold (e.g., when fully charged).

Figure 6:
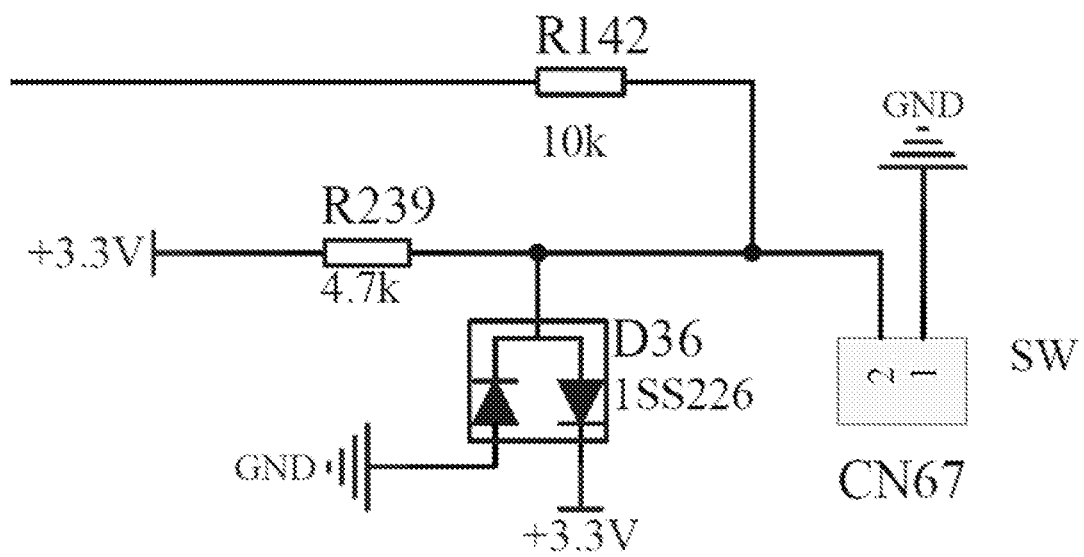
FIG. 6 is a schematic diagram of (part of) a control board circuit according to embodiments of the present application.

FIG. 6 is a schematic diagram of (part of) a control board circuit according to embodiments of the present application. As shown in FIG. 6, the control board circuit is connected to the battery box via an electrical connector CN67. For example, in combination with FIG. 4 as well as FIG. 6, the electrical connector CN67 in FIG. 6 is connected to the electrical connector CN1 in FIG. 4. At this time, when Vz in FIG. 4 is not present (i.e., when the power supply line is disconnected), whether sig is high level or low level will depend on the voltage divider value of R8 in FIGS. 4 and R239 in FIG. 6. In one embodiment, sig can be made to always be high when Vz is not present by reasonably selecting the relationship of R8 as well as R239.

At this time, the circuit shown in FIG. 4 for the energy storage state detection and the power supply line detection may be represented by the following logic diagram:

| Vcap | Vz | Sig |
|---|---|---|
| <Reference voltage Vref | Power supply line is normal | High level |
| <Reference voltage Vref | Power supply line is disconnected | High level |
| >Reference voltage Vref | Power supply line is disconnected | High level |
| >Reference voltage Vref | Power supply line is normal | Low level |

In other words, Sig outputs a low level ('0') only when the terminal voltage Vcap of the energy storage unit (capacitor modules in the energy storage unit) is greater than the reference voltage of the diode (e.g., 2.5 V) after being voltage-divided by the first resistor R1 and the fifth resistor R5, and the voltage Vz output from the battery box is connected normally; otherwise, all outputs a high level.

Figure 7:
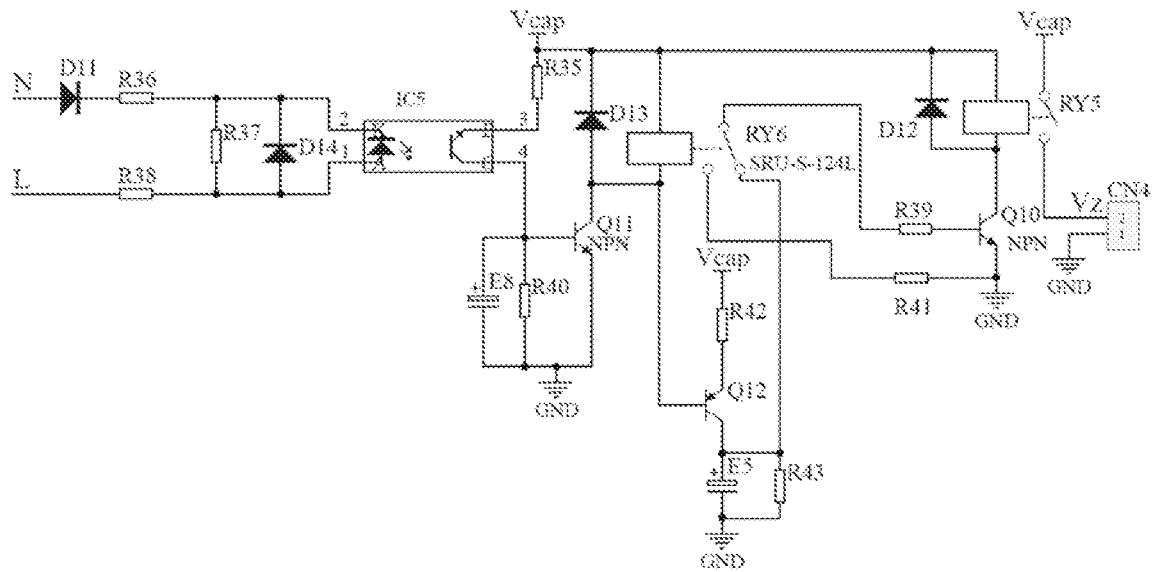
FIG. 7 is a circuit schematic diagram of power failure detection and power output switching according to embodiments of the present application.

FIG. 7 is a circuit schematic diagram of power failure detection and power output switching according to embodiments of the present application. As shown in FIG. 7, the circuit implements switching of outputs based on the result of power failure detection, wherein the voltage from the energy storage unit is output when the power failure is detected, and no voltage is output when the power failure is not detected. In addition, the circuit also implements automatic disconnection of the voltage output after a period of time in which the voltage is output (i.e., after a preset time period T of the power failure detected).

Specifically, when the power supply to L-terminal and N-terminal is normal, IC5 conducts and a triode Q11 conducts. This further causes a triode Q12 to conduct, a capacitor E5 is charged, a relay RY6 is attracted to a left moving contact, a triode Q10 is turned off, and Vcap is disconnected from Vz. That is, when the power supply to L-terminal and N-terminal is normal (i.e., no power failure has occurred), no voltage is output.

When the L-terminal and N-terminal is powered off, the triode Q11 is turned off, the relay Ry6 is attracted to the right, a base of the triode Q10 is powered by the capacitor E5, a relay RY5 is attracted, and Vcap is powered to Vz. That is, when the power failure occurs at the L-terminal and N-terminal, the voltage from the energy storage unit Vcap is output.

In addition, at this time, as the triode Q11 is turned off and the triode Q12 is turned off, the capacitor E5 is discharged below a certain threshold voltage (e.g., 0.7 V), and the triode Q10 will be turned off, i.e., automatic disconnection of voltage output is realized after outputting the voltage for a period of time. This discharge time (i.e., the automatic disconnection time) may be adjusted according to the capacitance value of the capacitor E5 and a resistor R43.

In one or more embodiments, the circuit schematic diagram of the power failure detection and the power output switching of FIG. 7 may correspond to the power failure detection unit 350 and the power output switching unit 370 of FIG. 3, wherein the power failure detection unit 350 is used to detect a power failure of the AC input voltage Vin, and the power output switching unit 370 is configured to output the stored electrical energy (i.e., voltage) when the power failure is detected, and configured not to output the voltage when the power failure is not detected.

Figure 8:
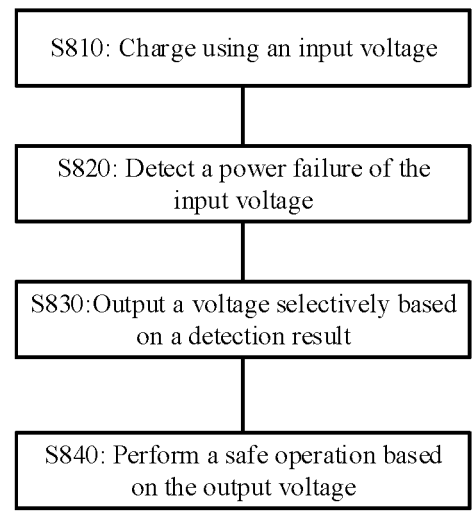
FIG. 8 is a flow schematic diagram of a control method for an air conditioning system according to embodiments of the present application.

FIG. 8 is a flow schematic diagram of a control method 8000 for an air conditioning system according to embodiments of the present application. As shown in FIG. 8, the control method 8000 includes the following steps:

In step S810, charging an energy storage capacitor in the air conditioning system using an input voltage;

In step S820, detecting a power failure of the input voltage;

In step S830, outputting a voltage from the energy storage capacitor when the power failure of the input voltage is detected, and not outputting the voltage when the power failure is not detected; and In step S840, performing a safe operation on the air conditioning system based on the output voltage.

Although not shown in FIG. 8, in one embodiment, the method 8000 further comprises: not outputting the voltage after a preset time period T of the power failure detected. In one embodiment, the method 8000 further comprises: outputting a "ready" signal when the voltage of the energy storage capacitor satisfies a preset voltage threshold and a voltage output terminal is normally connected; otherwise, outputting a "not ready" signal. In one embodiment, the step S840 (i.e., performing a safe operation on the air conditioning system based on the output voltage) comprises: actuating one or more valves (e.g., ball valves) to perform a shutdown operation when the "ready" signal is received and the output voltage is greater than a preset threshold.

In one embodiment, the battery box in an air conditioning system may be controlled as follows: when an external input voltage is normally provided, 220V AC power is present; the AC power is used to charge an energy storage unit; then, it is determined whether the energy storage unit is fully charged, and if it is not fully charged, the charging step is continued; and after it is fully charged, it is further determined whether the external input voltage has been disconnected (e.g., a sudden loss of power), and if so, provide 12V DC voltage to a control board circuit for a safe operation, and after a preset time period T, disconnect the supply of the 12V DC voltage.

In one embodiment, the control board circuit in the air conditioning system may be controlled as follows: after the control board circuit is powered up, it is determined whether the energy storage unit is fully charged, and in the event that it is fully charged, actuating the ball valve EBV to open; further, when it is determined that the external input voltage has been disconnected (e.g., a sudden loss of power), actuating the ball valve EBV to shut down. In a control method, the result of the shutdown of the ball valve EBV (whether it is completely shut down or not) may also be provided by the control board circuit to the battery box so that the battery box may promptly cut off the supply of the backup power supply.

In summary, in accordance with some embodiments of the present application, a battery box comprises a power output switching unit, the power output switching unit is configured to output a voltage from a charging and energy storage unit when a power failure detection unit detects a power failure of an input voltage of the battery box, and configured not to output the voltage when the power failure detection unit does not detect the power failure. In this way, the battery box is capable of, on the one hand, performing voltage output in a timely manner in the event of a sudden power failure, thereby providing sufficient energy for a related control circuit (e.g., a control board circuit) to perform a safe operation (e.g., shutting down a ball valve), and, on the other hand, performing no voltage output in the event of no power failure, thereby not affecting other control circuits. In accordance with some embodiments of the present application, the power output switching unit is also configured not to output the voltage after a preset time period T of the power failure detected by the power failure detection unit. That is, the battery box is capable of not only automatically providing energy (voltage output) at the time of power failure, but also automatically cutting off the energy output after a time period.

Those skilled in the art will appreciate that the various illustrative logical blocks, modules, circuits, and algorithm steps described herein may be implemented as electronic hardware, computer software, or combinations of both.

To demonstrate this interchangeability between hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in changing ways for the particular application. However, such implementation decisions should not be interpreted as causing a departure from the scope of the present application.

Although only a few of the specific embodiments of the present application have been described, those skilled in the art will appreciate that the present application may be embodied in many other forms without departing from the spirit and scope thereof. Accordingly, the examples and implementations presented are to be regarded as illustrative and not restrictive, and various modifications and substitutions may be covered by the application without departing from the spirit and scope of the application as defined by the appended claims.

The embodiments and examples presented herein are provided to best illustrate embodiments in accordance with the present technology and its particular application, and to thereby enable those skilled in the art to implement and use the present application. However, those skilled in the art will appreciate that the above description and examples are provided for convenience of illustration and example only. The presented description is not intended to cover every aspect of the application or to limit the application to the precise form disclosed.

What is claimed is:

1. An air conditioning system battery box, characterized by the system comprising:
    a battery box comprising:
        a charging and energy storage unit for charging and storing electrical energy using an input voltage supplied to the battery box;
        a power failure detection unit for detecting a power failure of the input voltage; and
        a power output switching unit for switching an output based on a detection result of the power failure detection unit, wherein the power output switching unit is configured to output a voltage from the charging and energy storage unit when the power failure detection unit detects a power failure, and is configured not to output the voltage when the power failure detection unit does not detect the power failure; and
    a control board circuit for receiving the output voltage from the battery box for a safe operation, wherein the control board circuit is configured to actuate one or more valves to perform a shutdown operation when the output voltage provided by the battery box is greater than a preset threshold.

2. The air conditioning system of claim 1, wherein the power output switching unit is further configured not to output the voltage after a preset time period T of the power failure detected by the power failure detection unit.

3. The air conditioning system of claim 1, wherein the charging and energy storage unit comprises:
    an energy storage unit; and
    a charging unit for converting an AC input voltage supplied to the battery box to a DC voltage for charging the energy storage unit.

4. The air conditioning system of claim 3, wherein the charging and energy storage unit further comprises:
    a voltage regulating unit for converting a first DC voltage from the energy storage unit to a second DC voltage.

5. The air conditioning system of claim 3, further comprising:
    an energy storage state detection unit for detecting whether a voltage from the energy storage unit satisfies a preset voltage threshold.

6. The air conditioning system of claim 5, further comprising:
    a power supply line detection unit for detecting whether an output of the battery box is normally connected.

7. The air conditioning system of claim 6, wherein the battery box is configured to output a "ready" signal when the energy storage state detection unit detects that the voltage from the energy storage unit satisfies the preset voltage threshold and the power supply line detection unit detects that the output of the battery box is normally connected; otherwise, the battery box is configured to output a "not ready" signal.

8. The air conditioning system of claim 7, further comprising:
    a micro-control unit M CU for receiving a power failure detection signal from the power failure detection unit and controlling the power output switching unit accordingly.

9. The air conditioning system of claim 8, wherein the micro-control unit M CU is further configured to receive a first detection signal from the energy storage state detection unit and a second detection signal from the power supply line detection unit; and
    the micro-control unit M CU is configured to output a "ready" signal when the first detection signal indicates that the voltage from the energy storage unit satisfies the preset voltage threshold and the second detection signal indicates that the output of the battery box is normally connected; otherwise, to output a "not ready" signal.

10. A control method for an air conditioning system, the control method comprising:
   charging an energy storage capacitor in the air conditioning system using an input voltage;
   outputting a voltage of the energy storage capacitor for performing a safe operation on the air conditioning system based on the output voltage;
   outputting a "ready" signal when the voltage of the energy storage capacitor satisfies a preset voltage threshold and a voltage output terminal is normally connected; otherwise, outputting a "not ready" signal; and
   actuating one or more valves to perform a shutdown operation when the "ready" signal is received and the output voltage is greater than a preset threshold.

11. The method of claim 10, wherein the control method further comprises:
   detecting a power failure of the input voltage; and
   outputting the voltage of the energy storage capacitor when the power failure of the input voltage is detected, and not outputting the voltage when the power failure is not detected.

12. The method of claim 11, wherein the method further comprises:
   not outputting the voltage after a preset time period T of the power failure detected.

13. An air conditioning system, the system comprising:
   a battery box configured to output an output voltage; and
   a control board circuit for receiving the output voltage from the battery box for a safe operation, wherein the control board circuit is configured to actuate one or more valves to perform a shutdown operation when the output voltage provided by the battery box is greater than a preset threshold.

14. The system of claim 13, wherein the battery box is configured to output the output voltage when a power failure is detected.

15. The system of claim 14, wherein the battery box further comprises:
   a charging and energy storage unit for charging and storing electrical energy using an input voltage supplied to the battery box.

16. The system of claim 13, wherein the battery box further comprises:
   a charging and energy storage unit for charging and storing electrical energy using an input voltage supplied to the battery box.

17. The system of claim 16, wherein the power output switching unit is configured to output the voltage from the charging and energy storage unit when the power failure, and is configured not to output the voltage when the power failure detection unit does not detect the power failure.

18. The system of claim 13, wherein the battery box further comprises:
   a power failure detection unit for detecting a power failure of the input voltage; and
   a power output switching unit for switching an output based on a detection result of the power failure detection unit.

* * * * *